United States Patent [19]

Brown et al.

[11] 4,255,542

[45] Mar. 10, 1981

[54] EXOTHERMIC POLYMERIZATION IN A VERTICAL FLUID BED REACTOR SYSTEM CONTAINING COOLING MEANS THEREIN AND APPARATUS THEREFOR

[75] Inventors: Gary L. Brown, South Charleston, W. Va.; David F. Warner, Beaumont, Tex.; Jae H. Byon, South Charleston, W. Va.

[73] Assignee: Union Carbide Corporation, New York, N.Y.

[21] Appl. No.: 964,989

[22] Filed: Nov. 30, 1978

Related U.S. Application Data

[63] Continuation-in-part of Ser. No. 897,512, Apr. 18, 1978, abandoned.

[51] Int. Cl.³ .................... C08F 2/34; C08F 10/02
[52] U.S. Cl. ................................ 526/88; 526/68; 526/106; 526/125; 526/129; 526/130; 526/348; 526/348.6; 526/901
[58] Field of Search ......................... 526/88, 68

[56] References Cited

U.S. PATENT DOCUMENTS

| | | | |
|---|---|---|---|
| 3,254,070 | 5/1966 | Roden | 526/88 |
| 3,770,714 | 11/1973 | Dorschner et al. | 526/88 |
| 3,922,322 | 11/1975 | Roger et al. | 526/88 |
| 4,011,382 | 3/1977 | Levine et al. | 526/106 |

FOREIGN PATENT DOCUMENTS 827606 4/1975 Belgium .
1184221 3/1970 United Kingdom .

*Primary Examiner*—Edward J. Smith
*Attorney, Agent, or Firm*—Clement J. Vicari

[57] ABSTRACT

A continuous low pressure gas phase process for the production of solid particulate polymers during an exothermic polymerization reaction in a uniform diameter vertical fluidized bed reactor system which comprises feeding a polymerization catalyst and a gaseous stream containing at least one polymerizable monomer to a fluidized bed of polymer particles and removing the exothermic heat of reaction by indirect cooling means in the reactor and removing dry particulate polymer. Also, apparatus for the polymerization process is described.

6 Claims, 1 Drawing Figure

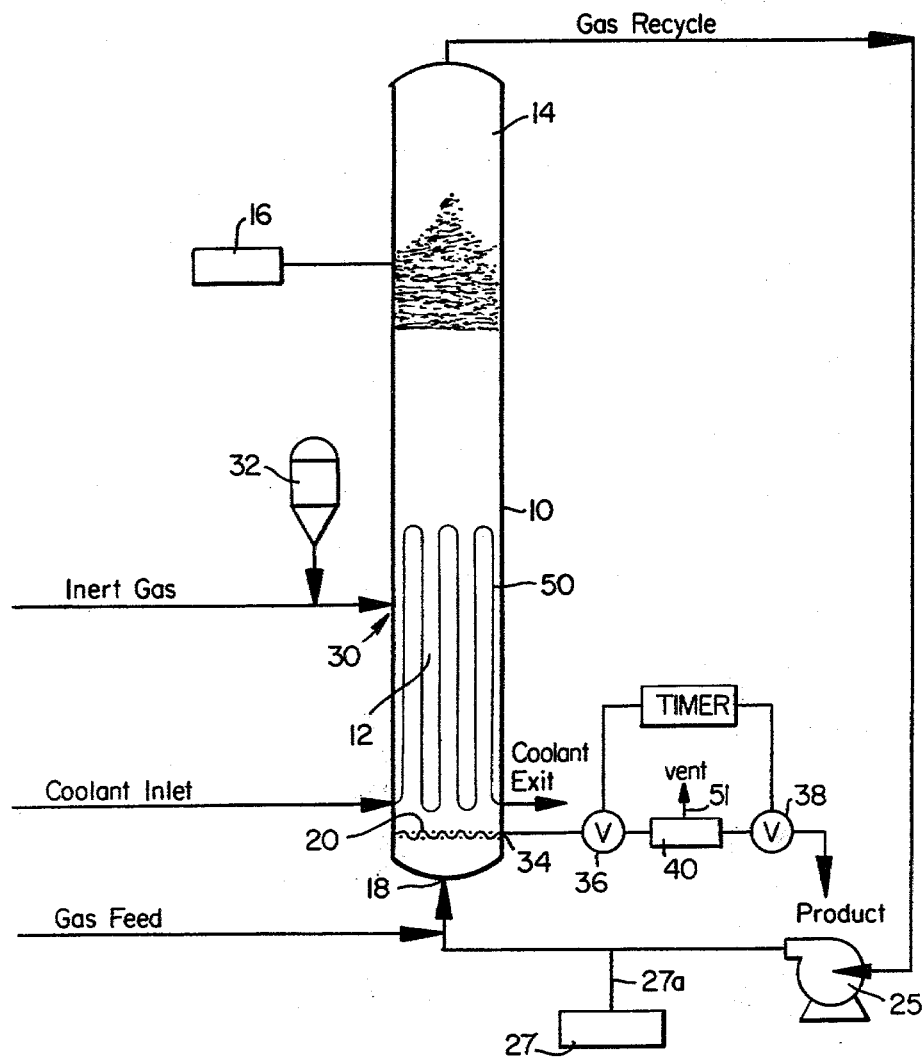

EXOTHERMIC POLYMERIZATION IN A VERTICAL FLUID BED REACTOR SYSTEM CONTAINING COOLING MEANS THEREIN AND APPARATUS THEREFOR

This application is a continuation-in-part of patent application Ser. No. 897,512, filed Apr. 18, 1978 now abandoned.

BACKGROUND OF THE INVENTION

This invention relates to a continuous low pressure gas phase process for the production of solid particulate polymers during an exothermic polymerization reaction in a uniform diameter vertical fluidizing bed reactor system which process comprises feeding a polymerization catalyst and a gaseous stream containing a least one polymerizable monomer to a fluidized bed of polymer particles and removing the exothermic heat of reaction by indirect cooling means in the reactor and removing dry particulate polymer. Also, this invention relates to a uniform diameter vertical fluidized bed reactor system containing an indirect cooling means in the reactor.

DESCRIPTION OF THE PRIOR ART

U.S. Pat. Nos. 4,011,382 and 4,003,712 describe a gas phase fluid bed process for preparing olefin polymers in the presence of a high activity catalyst. Specifically, U.S. Pat. No. 4,011,382 discloses that low density polyethylene can be produced commercially at pressures of <1000 psi in a gas phase reaction in the absence of solvents by employing selected chromium and titanium (and, optionally, fluorine) containing catalysts under specific operating conditions in a fluid bed process.

The fluid bed reactor is preferably described in said patents as a vertical reactor having a cylindrical lower section and an upper section having a cross section greater than that of said lower section which upper section is described as a velocity reduction zone.

In the fluidization process, the portion of the gas stream which does not react in the fluidized bed constitutes the recycle stream, which is removed from the polymerization zone by passing it into said velocity reduction zone located above the bed. In the velocity reduction zone, the velocity of the recycle stream is reduced, allowing entrained particles to fall back into the bed. Particle removal from the recycle stream may be aided by a cyclone. The use of a velocity reducing zone and a cyclone was believed necessary to prevent the fine particles entrained in the gas from being carried into the recycle system where they build up and cause pluggage of the heat exchanger. In a fluid bed reactor with an upper velocity reduction zone of cross section greater than that of the lower bed section, the upper and lower sections are connected by a transition section having sloped walls. When using such a fluid bed reactor, a portion of the fine particles entrained by the gas in the polymerization zone of the lower section and separated from the recycle stream in the velocity reduction zone, fall onto the sloped walls of the transition section. These fine particles build up over a period of time. Since the fine particles contain active catalyst, they react with the monomer present in the recycle, forming solid sheets which can grow until they block recycle gas flow or slide off the sloped walls of the transition section of the reactor and into the polymerization zone. In the polymerization zone, these sheets block the flow of gas in a portion of the bed above the sheet resulting in decreased fluidization and also fusing of the polymer particles in the unfluidized region from lack of heat removal from the particles by the gas. Thus, large chunks of polymer which can block the entire polymerization zone can be formed unless the reaction is stopped and the sheets are removed. To minimize the formation of sheets on the sloping walls of the transition section, it is necessary to operate the reactor with the upper surface of the fluidized bed at or slightly below the bottom of the transition section. Operation at this level causes larger particles from the fluidized bed to be thrown onto the sloping walls of the transition section due to the bursting of gas bubbles at the surface of the fluidized bed whereby they tend to sweep the more reactive fine particles from the sloping walls back into the fluidized bed. This requires operation at an essentially constant fluidized bed level and prevents reducing that level to facilitate transitions or start-up.

In U.S. Pat. No. 3,298,792 a means to minimize build-up of sheets on sloped walls in a fluid bed is disclosed, namely, a vertically-located scraper actuated by a driving shaft for removing particles adhering to the walls. This technique worked well in a small fluid bed reactor according to the patent examples, but operation of such a device on a large commercial scale reactor would be difficult if not impossible. The fluid bed in said patent is conically shaped having a smaller diameter at the bottom of the reactor than at the top; thus, it has sloping walls in both the fluid bed section or polymerization zone and in the velocity reduction section above the polymerization zone. The vertically-located scraper removes particles adhering to the wall in both the polymerization and velocity reduction zones of the reactor. Means to agitate a vertical fluidized bed and/or remove particles adhering to the reactor walls are disclosed in U.S. Pat. Nos. 3,300,457 and 4,012,573, for example.

It has been found that it is possible to operate a fluidized-bed polymerization reactor without a velocity reduction zone or a cyclone to separate fine particles from the gas, resulting in many advantages. The most important advantage is that the formation of sheets on the sloped walls of the transition zone is eliminated. This results in much reduced frequency of reactor stoppage to remove sheets from the reactor. A second advantage is that the depth of the bed in the polymerization zone can be varied over a wide range allowing greatly increased range of reactor output with good operation. The ability to vary the bed depth also allows a minimum amount of cross-contaminated material to be made when changing from the production of one product to that of a new product. This is done by lowering the bed to some mininum level prior to starting the product changeover and maintaining the bed at the minimum level until the product being produced meets and new product specification. The production rate per unit volume of bed used (pounds of product per hour per cubic foot) can usually be increased during the product changeover at reduced bed level since the heat removal capacity and product discharge capacity of the system are sized for operation at normal bed volume. This enables a reduction in changeover time as well as in the volume of resin produced during a product changeover.

A further advantage of the uniform diameter reactor is that a smaller initial charge of powdered material is required to start up successfully without sheet formation. The cost of fabrication of a fluid bed reactor without a velocity reduction zone of enlarged cross section is substantially reduced because the larger diameter portion is not required nor is the transition zone with sloping sides. The entrainment of particles is increased on operation without a velocity reduction zone, cyclone, or filter, typically by a factor of 100 to 1000 fold. It was expected that this increase in particle concentration in the recycle stream would make the reactor inoperable by causing a build-up of fines in the recycle piping and on the distributor plate below the bed. In addition it was expected that the particles would cause the recycle compressor to become inoperable by abrasion or by build-up of particles on the moving parts of the compressor. Unexpectedly, it was found that if the velocity in all portions of the recycle piping is kept high and that the recycle system is designed so as to minimize areas of low velocity or dead zones, build-up of particles in the recycle piping and distributor plates was not a problem. It was also found that the build-up of particles on the moving parts of the compressor was minimal so as not to affect its operation or efficiency and that the fine polymer particles which are entrained did not cause abrasion of the compressor. It was also found, however, that the fine particles built-up rapidly on the heat exchanger.

The possibility of particles build-up in the heat exchanger can be eliminated by the installation of cooling means within the fluid-bed itself; a so-called internal cooler. Since the gas is used as the heat transfer medium with an external cooler, the reaction rate was previously limited by the gas velocity through the bed which has to remain low enough so as not to entrain large amounts of solids from the bed yet high enough to permit adequate heat removal. Internal cooling means removes heat of reaction directly from the solid particles and the gas velocity can be much lower thus using considerably less energy. In addition since the heat removal is independent of gas mass flow rate, the reactor pressure can also be decreased to a limit defined by the polymerization kinetics. If cooling tubes are imbedded vertically in the fluidized bed of the present invention, they tend to deter the agglomeration of large bubbles, thus increasing the quality of fluidization. When bubbles agglomerate in a fluidized bed which is their natural tendency as they rise up the bed, gas is pulled from the edges of the bed toward the center which decreases the mixing ability near the walls and thus causes the bed to be inhomogeneous. Vertical tubes, which act as baffles, tend to deter the migration of bubbles to the center of the bed and to increase mixing near the walls.

When external cooling is used in a gas phase fluidized bed, the gas entering the bottom of the bed is cooler than the bed itself. Since the physical properties of the polymers made with certain catalysts are temperature sensitive, the bottom portion of the bed which is cooler produces polymers with different physical properties. These particles are then mixed with the rest of the bed which causes, in particular, broadening of molecular weight distribution of the polymer. Using internal cooling means, heat is removed from the polymer itself and the entering fluidizing gas is therefore at the same temperature as the entire fluidized bed.

An additional problem encountered with an external cooler is that low molecular weight oligomers which are produced during polymerization and which are volatile at reactor temperatures can condense on the cold surface of the external cooler and cause fines to adhere to the heat exchanger resulting in increased rate of pluggage. In addition, when olefin copolymers are produced using relatively high boiling comonomers, the monomers can also condense in an external cooler causing pluggage of the heat exchanger. This condensation cannot happen using internal cooling means since the recycle system is at the same temperature as the reactor.

SUMMARY OF THE INVENTION

It has now been found that polymers or copolymers can be produced with relatively low catalyst residues for commercial purposes by a low pressure gas phase process, if at least one polymerizable monomer is polymerized or copolymerized in the presence of a polymerization catalyst in a vertical uniform diameter fluidized bed reactor system containing indirect cooling means in the reactor to remove the exothermic heat of reaction.

The object of this invention is to produce polymers, particularly olefin polymers, in an improved reactor system which provides greater operating flexibility and continuity by the use of a vertical fluidized bed reactor of uniform diameter and variable bed height utilizing indirect internal cooling means for removing the heat generated by polymerization within the fluid bed.

BRIEF DESCRIPTION OF THE DRAWINGS

FIG. 1 shows a vertical fluid bed reactor system with an internal cooler.

DESCRIPTION OF THE PREFERRED EMBODIMENTS

1. The Olefin Polymers

The olefin polymers which are prepared in accordance with the teachings of the present invention are solid materials. The ethylene polymers have densities of about 0.91 to 0.97, inclusive, and melt indexes of about 0.1 to 100 or more.

The olefin polymers produced herein are prepared by homo-polymerizing or copolymerizing one or more alpha-olefins containing 2 to about 12, inclusive, carbon atoms. The $\alpha$-olefins monomers may be mono-olefins or non-conjugated di-olefins.

The mono-$\alpha$-olefins which may be polymerized would include ethylene, propylene, butene-1, pentene-1, 3-methylbutene-1, hexene-1, 4-methyl-pentene-1,3-ethylbutene-1, heptene-1, octene-1, decene-1, 4,4-dimethylpentene-1, 4,4-diethyl hexene-1, 3,4-dimethylhexene-1, 4-butyl-1-octene, 5-ethyl-1 decene, 3,3-dimethylbutene-1, and the like. Diolefins which may be used include 1,5-hexadiene, dicyclopentadiene, ethylidene norbornene, and other non-conjugated diolefins.

2. The High Activity Catalyst

The catalyst employed herein is a high activity transition metal, preferably chromium and/or titanium, containing catalyst. By high activity catalyst is meant that it must have a level of productivity of $\geq 50,000$, and preferably $\geq 100,000$, pounds of polymer per pound of transition metal in the catalyst. This is so because fluidized bed gas phase processes usually do not employ any catalyst residue removing procedures. Thus, the catalyst residue in the polymer must be so small that it can be left in the polymer without causing any undue problems in the hands of the resin fabricator and/or ultimate consumer. Low catalyst residue contents are important where the catalyst is made with chlorine containing material such as the titanium, magnesium and/or aluminum chlorides used in some so-called Ziegler or Ziegler-Natta catalysts. High residual chlorine values in a molding resin will cause pitting and corrosion on the metal surfaces of the molding devices.

The high activity transition metal containing catalysts which may be used in the practice of this invention include the following:

I. The silyl chromate catalysts disclosed in U.S. Pat. No. 3,324,101 to Baker and Carrick and U.S. Pat. No. 3,324,095 to Carrick, Karapinka and Turbett, which are hereby incorporated by reference. The silyl chromate catalysts are characterized by the presence therein of a group of the formula:

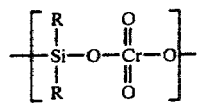

wherein R is a hydrocarbyl group having from 1 to 14 carbon atoms. The preferred silyl chromate catalysts are the bis triarylsilyl chromates and more preferably bistriphenylsilyl chromate.

This catalyst is used on a support such as silica, alumina, thoria, zirconia and the like, other supports such as carbon black, micro-crystalling cellulose, the non-sulfonated ion exchange resins and the like may be used.

II. The bis(cyclopentadienyl) chromium [II] compounds disclosed in U.S. Pat. No. 3,879,368, which patent is incorporated herein by reference. These bis(-cyclopentadienyl) chromium [II] compounds have the following formula:

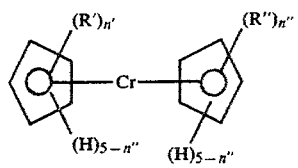

wherein R' and R" may be the same or different $C_1$ to $C_{20}$, inclusive, hydrocarbon radicals, and n' and n" may be the same or different integers of 0 to 5, inclusive. The R' and R" hydrocarbon radicals may be saturated or unsaturated, they may include aliphatic, alicyclic and aromatic radicals such as methyl, ethyl, propyl, butyl, pentyl, cyclopentyl, cyclohexyl, allyl, phenyl and naphthyl radicals.

These catalysts are used on a support as heretofore described.

III. The catalysts as described in U.S. Pat. No. 4,011,382, which patent is incorporated herein by reference. These catalysts contain chromium and titanium in the form of oxides and, optionally, fluorine and a support. The catalysts contain, based on the combined weight of the support and the chromium, titanium and fluorine, about 0.05 to 3.0, and preferably about 0.2 to 1.0, weight percent of chromium (calculated as Cr), about 1.5 to 9.0, and preferably about 4.0 to 7.0, weight percent of titanium (calculated as Ti), and 0.0 to about 2.5, and preferably about 0.1 to 1.0, weight percent of fluorine (calculated as F).

The chromium compounds which may be used include $CrO_3$, or any compound of chromium which is oxidizable to $CrO_3$ under the activation conditions employed. At least a portion of the chromium in the supported, activated catalyst must be in the hexavalent state. Chromium compounds other than $CrO_3$ which may be used are disclosed in U.S. Pat. No. 2,825,721 and U.S. Pat. No. 3,622,521 (the disclosures of which patents are hereby incorporated by reference) and include chromic acetyl acetonate, chromic nitrate, chromic acetate, chromic chloride, chromic sulfate, and ammonium chromate.

Water soluble compounds of chromium, such as $CrO_3$, are the preferred compounds for use in depositing the chromium compound on the support from a solution of the compound. Chromium compounds soluble in organic solvents may also be used.

The titanium compounds which may be used include all those which are oxidizable to $TiO_2$ under the activation conditions employed, and include those disclosed in U.S. Pat. No. 3,622,521 and Netherlands Patent Application No. 72-10881 (the disclosures of which publications are hereby incorporate by reference). These compounds include those having the structures

and

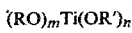

where m is 1, 2, 3, or 4; n is 0, 1, 2, or 3 and m+n=4, and,

where
R is a $C_1$ to $C_{12}$ alkyl, aryl or cycloalkyl group, and combinations thereof, such as aralkyl, alkaryl, and the like;

R' is R, cyclopentadienyl, and $C_2$ to $C_{12}$ alkenyl groups, such as ethenyl, propenyl, isopropenyl, butenyl and the like; and X is chlorine, bromine, fluorine or iodine.

The titanium compounds would thus include titanium tetrachloride, titanium tetraisopropoxide, and titanium tetrabutoxide. The titanium compounds are more conveniently deposited on the support from a solution in a hydrocarbon solvent.

The titanium (as Ti) is present in the catalyst, with respect to the Cr (as Cr), in a mole ratio of about 0.5 to 180, and preferably of about 4 to 35.

The fluorine compounds which may be used include HF, or any compound of fluorine which will yield HF under the activation conditions employed. Fluorine compounds other than HF which may be used are disclosed in Netherlands Patent Application No. 72-10881. These compounds include ammonium hexafluorosilicate, ammonium tetrafluoroborate, and ammonium hexafluorotitanate. The fluorine compounds are conveniently deposited on the support from an aqueous solution thereof, or by dry blending the solid fluorine compounds with the other components of the catalyst prior to activation.

The inorganic oxide materials which may be used as a support in the catalyst compositions are porous materials having a high surface area, that is, a surface area in the range of about 50 to about 1000 square meters per gram, and an average particle size of about 50 to 200 microns. The inorganic oxides which may be used include silica, alumina, thoria, zirconia and other comparable inorganic oxides, as well as mixtures of such oxides.

The catalyst support which may have the chromium and/or fluorine compound deposited thereon should be dried before it is brought into contact with the titanium compound. This is normally done by simply heating or predrying the catalyst support with a dry inert gas or dry air prior to use. It has been found that the temperature of drying has an appreciable effect on the molecular weight distribution and the melt index of the polymer produced. The preferred drying temperature is 100° to 300° C.

Activation of the supported catalyst can be accomplished at nearly any temperature up to about its sintering temperature. The passage of a stream of dry air or oxygen through the supported catalyst during the activation aids in the displacement of the water from the support. Activation temperatures of from about 300° C. to 900° C. for a period of about six hours should be sufficient if well-dried air or oxygen is used, and the temperature is not permitted to get so high as to cause sintering of the support.

IV. The catalysts as described in U.S. patent application, Ser. No. 892,325, filed on Mar. 31, 1978, now abandoned and refiled as application Ser. No. 014,414 on Feb. 27, 1979, in the names of F. J. Karol et al, and entitled, "Preparation of Ethylene Copolymers in Fluid Bed Reactor" and assigned to the same assignee as the present application. These catalysts comprise at least one titanium compound, at least one magnesium compound, at least one electron donor compound, at least one activator compound and at least one inert carrier material, as defined below.

The titanium compound has the structure $$Ti(OR)_a X_b$$

wherein

R is a $C_1$ to $C_{14}$ aliphatic or aromatic hydrocarbon radical, or COR' where R' is a $C_1$ to $C_{14}$ aliphatic or aromatic hydrocarbon radical;

X is Cl, Br, or I; a is 0 or 1; b is 2 to 4 inclusive; and $a+b=3$ or 4.

The titanium compounds can be used individually or in combinations thereof, and would include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The magnesium compound has the structure $$MgX_2$$

wherein X is Cl, Br, or I. Such magnesium compounds can be used individually or in combinations thereof and would include $MgCl_2$, $MgBr_2$ and $MgI_2$. Anhydrous $MgCl_2$ is the preferred magnesium compound.

About 0.5 to 56, and preferably about 1 to 10, moles of the magnesium compound are used per mole of the titanium compound in preparing the catalysts employed in the present invention.

The titanium compound and the magnesium compound should be used in a form which will facilitate their dissolution in the electron donor compound, as described herein below.

The electron donor compound is an organic compound which is liquid at 25° C. and in which the titanium compound and the magnesium compound are partially or completely soluble. The electron donor compounds are known as such or as Lewis bases.

The electron donor compounds would include such compounds as alkyl esters of aliphatic and aromatic carboxylic acids, aliphatic ethers, cyclic ethers and aliphatic ketones. Among these electron donor compounds the preferable ones are alkyl esters of $C_1$ to $C_4$ saturated aliphatic carboxylic acids; alkyl esters of $C_7$ to $C_8$ aromatic carboxylic acids; $C_2$ to $C_8$, and preferably $C_3$ to $C_4$, aliphatic ethers; $C_3$ to $C_4$ cyclic ethers, and preferably $C_4$ cyclic mono- or di-ether; $C_3$ to $C_6$, and preferably $C_3$ to $C_4$, aliphatic ketones. The most preferred of these electron donor compounds would include methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

About 2 to 85, and preferably about 3 to 10 mols of the electron donor compound are used per mol of Ti.

The activator compound has the structure $$Al(R'')_c X'_d H_e$$

wherein X' is Cl or $OR_1$; $R_1$ and R" are the same or different and are $C_1$ to $C_{14}$ saturated hydrocarbon radicals, d is 0 to 1.5, e is 1 or 0, and $c+d+e=3$.

Such activator compounds can be used individually or in combinations thereof and would include $(Al(C_2H_5)_3, Al(C_2H_5)_2Cl, Al(i-C_4H_9)_3, Al_2(C_2H_5)_3Cl_3,$ $Al(i-C_4H_9)_2H, Al(C_6H_{13})_3, Al(C_2H_5)_2H,$ and $Al(C_2H_5)_2(OC_2H_5)$.

About 10 to B 400, and preferably about 10 to 100, moles of the activator compound are used per mole of the titanium compound in activating the catalyst employed in the present invention.

The carrier materials are solid, particulate materials and would include inorganic materials such as oxides of silicon and aluminum and molecular sieves, and organic materials such as olefin polymers, e.g., polyethylene. The carrier materials are used in the form of dry powders having an average particle size of about 10 to 250, and preferably of about 50 to 150 microns. These materials are also preferably porous and have a surface area of $\geq 3$, and preferably of $\geq 50$, square meters per gram. The carrier material should be dry, that is, free of absorbed water. This is normally done by heating or predrying the carrier material with a dry inert gas prior to use. The inorganic carrier may also be treated with about 1 to 8 percent by weight of one or more of the aluminum alkyl compounds described above to further activate the carrier.

3. The Fluidized Bed Reaction System

The fluidized reaction system which is used in the practice of this invention is illustrated in FIG. 1. With reference to FIG. 1, the reactor 10 consists of a reaction zone 12 comprising a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed must be above the minimum flow required for fluidization, and preferably from about 1.5 to less than 10 times $G_{mf}$ and more preferably from about 2 to about 6 times $G_{mf}$. $G_{mf}$ is used in the accepted form as the abbreviation for the minimum mass gas flow required to achieve fluidization, C. Y. Wen and Y. H. Yu, "Mechanics of Fluidization", Chemical Engineering Progress Symposium Series, Vol. 62, p. 100-111 (1966).

It is essential that the bed always contains particles to prevent the formation of localized "hot spots" and to entrap and distribute the particulate catalyst throughout the reaction zone. On start up, the reaction zone is usually charged with a bed of particulate polymer particles before gas flow is initiated. Such particles may be identical in nature to the polymer to be formed or different therefrom. When different, they are withdrawn with the desired formed polymer particles as the first product. Eventually, a fluidized bed of the desired polymer particles supplants the start-up bed.

The partially or completely activated precursor compound (the catalyst) used in the fluidized bed is preferably stored for service in a reservoir 32 under a blanket of a gas which is inert to the stored material, such as nitrogen and argon.

Fluidization is achieved by a high rate of gas recycle to and through the bed, typically in order of about 50 times the rate of feed of make-up gas. The fluidized bed has the general appearance of a dense mass of viable particles created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate at least equal to the rate at which particulate polyer product is withdrawn. The composition of the make-up gas is determined by a gas analyzer 16 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone through a transport disengaging section 14 above the bed where entrained particles are given an opportunity to drop back into the bed.

The recycle gas is then compressed in a compressor 25 and then returned to the reactor. The reactor 10 contains an internal cooler which consists of tubing 50 located within the fluidized bed through which the heat of reaction is removed to a coolant. Although bare tubes are shown as the internal cooler in FIG. 1, several types of coolers could be used such as finned tubes or plate coils.

The temperature of the resin in the bed is controlled by adjusting the temperature and/or the flowrate of the coolant flowing into the internal cooler as required to maintain the bed at an essentially constant temperature.

By constantly removing heat of reaction, no noticeable temperature gradient appears to exist within the bed. Since the recycle gas is not cooled, the temperature of the gas entering the fluid bed 12 through the distribution plate 20 is at essentially the same temperature as the recycle gas leaving the bed through the transport disengagement section 14.

The distribution plate 20 plays an important role in the operation of the reactor. The fluidized bed contains growing and formed particulate polymer particles as well as catalyst particles. As the polymer particles are hot and possibly active, they must be prevented from settling for if a quiescent mass is allowed to exist, any active catalyst contained therein may continue to react and cause fusion. Recycle gas flow through the bed at a rate sufficient to maintain fluidization within the bed is, therefore, important. The distribution plate 20 serves this purpose and may be a screen, slotted plate, perforated plate, a plate of the bubble cap type, and the like. The elements of the plate may all be stationary, or the plate may be of the mobile type disclosed in U.S. Pat. No. 3,298,792. Whatever its design, it must distribute the recycle gas through the particles at the base of the bed to keep them in a fluidized condition, and also serve to support a quiescent bed of resin particles when the reactor is not in operation.

Hydrogen may be used to control molecular weight in the polymerization reaction of the present invention. The ratio of hydrogen/ethylene employed will vary between about 0 to about 2.0 moles of hydrogen per mole of the monomer in the gas stream.

Any gas inert to the catalyst and reactants can also be present in the gas stream. The activator compound is preferably added to the reaction system in the recycle line. Thus, the activator may be fed into the gas recycle system from dispenser 27 thru line 27A.

It is essential to operate the fluid bed reactor at a temperature below the fusing temperature of the polymer particles. To insure that fusion will not occur, operating temperatures below the fusing temperature are desired. For the production of ethylene copolymers in the process of the present invention an operating temperature of about 30° to 125° C. is preferred, and a temperature of about 75° to 115° C. is most preferred.

The fluid bed reactor is operated at pressures of up to about 1000 psi, and is preferably operated at a pressure of from about 50 to 350 psi.

The partially or completely activated precursor composition (catalyst) is injected into the bed at a rate equal to its consumption at a point 30 which is above the distribution plate 20. Preferably, the catalyst is injected at a point located about ¼ to ¾ up the side of the bed. Injecting the catalyst at a point above the distribution plate is an important feature of this invention. Since the catalysts which may be used herein are highly active, injection of the fully activated catalyst into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

A gas which is inert to the catalyst such as nitrogen or argon is used to carry the partially or completely reduced precursor composition, and any additional activator compound or non-gaseous modifier that is needed, into the bed.

The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature and/or flow rate of the coolant in the internal cooler is adjusted upwards or downwards to accomodate the change in rate of heat generation. This insures the maintenance of an essentially constant temperature in the bed. Complete instrumentation of both the fluidized bed and the internal cooling system, is, of course, necessary to detect any temperature change in the bed so as to enable the operator to make a suitable adjustment in the temperature and/or flowrate of the coolant.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the coolant across the reactor (the difference between inlet coolant temperature and exit coolant temperature) is determinative of the rate of particulate polymer formation at a constant coolant velocity.

The particulate polymer product is conveniently and preferably withdrawn through the sequential operation of a pair of timed values 36 and 38 defining a segregation zone 40. While valve 38 is closed, the gas is vented through line 51. Valve 38 is then opened to deliver the product to an external recovery zone. Valve 38 is then closed to await the next product recovery operation.

Finally, the fluidized bed reactor is equipped with an adequate venting system to allow venting the bed during start up and shut down. The reactor does not require the use of stirring means and/or wall scraping means.

The highly active supported catalyst system described herein yields a fluid bed product having an average particle size between about 100 to about 1500 microns and preferably about 500 to about 1000 microns.

For good operation, the cooling means must be immersed in the fluidized bed portion of the reactor 10. If the cooling means extends above or below the fluidized bed, particles will settle on nonvertical surfaces and, since the particles contain active catalyst, will tend to grow and produce chunks of solid polymer which will hamper or prevent operation of the reactor.

The cooling means used in the reactor may be a cooler or heat exchanger. The design of the cooling means is such that the cross-sectional area of the cooling means does not reduce the free cross-sectional area of the bed so as to cause the local superficial velocity to exceed 10 times the minimum fluidization velocity. The cross-sectional area available for flow at the point where the cross-sectional area of the internal cooler is the greatest is the minimum free cross-sectional area.

The reactor described in FIG. 1 can be operated over a range of diameter to height ratios from about 1:1 to 1:10. The minimum fluidized bed depth is dependent on distributor plate design and bubble size and not on reactor diameter while the transport disengaging height is a complex function of particle size distribution, gas velocity, particle density, gas density and others. The transport disengagement section height is calculated as described in F. A. Zenz and D. F. Othmer, "Fluidization and Fluid Particle Systems", Reinhold Publishing Corp., 1960, pp. 374–387, which is incorporated herein by reference.

EXAMPLES

The properties of the polymers produced in the Examples were determined by the following test methods:
Density For materials having a density <0.940, ASTM-1505 procedure is used and plaque is conditioned for one hour at 100° C. to approach equilibrium crystallinity. For materials having a density of ≧0.940, a modified procedure is used wherein the test plaque is conditioned for one hour at 120° C. to approach equilibrium crystallinity and is then quickly cooled to room temperature. All density values are reported as grams/cm$^3$. All density measurements are made in a density gradient column.
Melt Index (MI)

ASTM D-1238—Condition E—Measured at 190° C.—reported as grams per 10 minutes.
Flow Rate (HLMI)

ASTM D-1238—Condition F—Measured at 10 times the weight used in the melt index test above.
Melt Flow Ratio (MFR)=Flow Rate Melt Index
Bulk Density The resin is poured via a funnel into a 100 ml graduated cylinder to 100 ml line without shaking the cylinder, and weighed by difference.
Space Time Yield Pounds of resin produced per hour per cubic foot of bed volume.

Catalyst Preparation

Catalyst A

To a solution of the desired amount of $CrO_3$ in three liters of distilled water there was added 500 grams of a porous silica support having an average particle size of about 70 microns and a surface area of about 300 square meters per gram. The mixture of the support, water was stirred and allowed to stand for about 15 minutes. It was then filtered to remove about 2200–2300 ml of solution. The $CrO_3$ loaded silica was then dried under a stream of nitrogen for about 4 hours at 200° C.

About 400 grams of the supported $CrO_3$ was then slurried in about 2000 ml of dry isopentane, and then a desired amount of tetraisopropyl titanate was added to the slurry. The system was then mixed thoroughly and then the isopentane was dried by heating the reaction vessel.

The dried material was then transferred to an activator (heating vessel) and a desired quantity of $(NH_4)_2SiF_6$ was added and admixed. The composition was then heated under $N_2$ at 50° C. for about 1 hour and then at 150° C. for about 1 hour to insure that all the isopentane was removed and to slowly remove organic residues from the tetraisopropyl titanate so as to avoid any danger of a fire. The $N_2$ stream was then replaced with a stream of dry air and the catalyst composition was activated at 300° C. for about 2 hours and then at 825° C. for about 8 hours. The activated catalyst was then cooled with dry air (at ambient temperatures) to about 150° C. and further cooled from 150° C. to room temperature with $N_2$ (at ambient temperature).

The amounts of the chromium, titanium, and fluorine compounds which were added to provide the desired levels of these elements in the activated catalyst are as follows:

| weight % of compound added to support | | weight % of element in activated catalyst | |
| --- | --- | --- | --- |
| $CrO_3$ | 0.6 | Cr | 0.3 |
| Ti(isopropyl)$_4$ | 26 | Ti | 4.2 |
| $(NH_4)_2SiF_6$ | 1.2 | F | 0.6 |

Catalyst B

About 2000 grams of a porous silica support having an average particle size of about 70 microns and a surface area of about 300 meters per gram were dehydrated in an activator (heating vessel). The silica was heated to 400° C. for about two hours and then heated to 600° C. for about 8 hours. The dehydrated silica was then cooled to room temperature by passing dry $N_2$ through it and stored under $N_2$. A portion of the dehydrated silica 462 g was then slurried in about 4000 ml of dry isopentane at 70° C. and about 350 ml of about 15 wt percent bis-(cyclopentadienyl) chromium II, i.e., chromocene in toluene was added and stirred for one hour in a closed vessel so the isopentane did not boil off. The catalyst was then dried at 90° C. for 30 hours under a $N_2$ purge and stored under $N_2$. The final catalyst contained about 6 wt percent chromocene.

Catalyst C

Catalyst C was prepared by adding one thousand grams of dehydrated silica as described for Catalyst B to 5500 ml of dry isopentane at 45° C. The slurry was stirred for 30 minutes, then 30 g of bis-triphenylsilylchromate was added to the slurry and stirring continued for 10 hours. Then 200 ml of a 20 wt percent solution of di-ethyl aluminum ethoxide in hexane was added over a 30 minute period. Stirring was continued for an additional 4 hours at which time the stirring was stopped and the liquid was decanted from the catalyst. Agitation was then restarted and the catalyst was dried for 24 hours at 70° C. under a slight $N_2$ purge and stored under $N_2$. The final catalyst contained about 3 wt percent bis-triphenylsilylchromate and had an Al/Cr molar ratio of about 6 to 1.

Catalyst D

I. Preparation of Impregnated Precursor

In a 12 l flask equipped with a mechanical stirrer are placed 41.8 g (0.439 mole)anhydrous $MgCl_2$ and 2.5 l tetrahydrofuran (THF). To this mixture, 27.7 g (0.184 mol) $TiCl_4$ is added dropwise over ½ hour. It may be necessary to heat the mixture to 60° C. for about ½ hour in order to completely dissolve the material.

500 g of porous silica is added and the mixture stirred for ¼ hour. The mixture is dried with a $N_2$ purge at 60° C. for about 3-5 hours to provide a dry free flowing powder having the particle size of the silica. The absorbed precursor composition has the formula

$TiMg_{3.0}Cl_{10}(THF)_{6.7}$

II. Activation Procedure

The desired weights of impregnated precursor composition and activator compound are added to a mixing tank with sufficient amounts of anhydrous aliphatic hydrocarbon diluent such as isopentane to provide a slurry system.

The activator compound and precursor compound are used in such amounts as to provide a partially activated precursor composition which has an Al/ti ratio of 0 to 10 and preferably of 4 to 8.

The contents of the slurry system are then thoroughly mixed at room temperature and at atmospheric pressure for about ¼ to ½ hour. The resulting slurry is then dried under a purge of dry inert gas such as nitrogen or argon at atmospheric pressure and at a temperature of 65°±10° C. to remove the hydrocarbon diluent. This process usually requires about 3 to 5 hours. The resulting catalyst is in the form of a partially activated precursor composition which is impregnated within the pores of the silica. The material is a free flowing particulate material having the size and shape of the silica. It is not pyrophoric unless the aluminum alkyl content exceeds a loading of 10 weight percent. It is stored under a dry inert gas such as nitrogen or argon prior to future use. It is now ready for use by being injected into, and fully activated within, the polymerization reactor.

When additional activator compound is fed to the polymerization reactor for the purpose of completing the activation of the precursor composition, it is fed into the reactor as a dilute solution in a hydrocarbon solvent such as isopentane. These dilute solutions contain 5 to 30 percent by volume of the activator compound.

The activator compound is added to the polymerization reactor so as to maintain the Al/Ti ratio in the reactor at a level of about 10 to 400 and preferably of 15 to 60:1.

The following Examples are intended to illustrate the process of the present invention and are not intended as a limitation upon the scope thereof.

EXAMPLES 1-6

For these Examples a reactor similar to that depicted in the Figure with a diameter (inner) of 13½ inches and a height of 26½ feet was used. Examples 1-6 were run under a gas velocity of 4-6 times Gmf and a pressure of 300 psig. The internal cooler consisted of four vertical loops about four feet long of 1 inch diameter stainless steel tubing through which tempered water was passed as the coolant. A portion of the line between the compressor and the reactor was jacketed to remove the heat added by the recycle compressor. For Example 1 only, the internal cooler was replaced by an external, single pass heat exchanger of vertical shell and tube design with the recycle gas flowing downward through the tubes and tempered water on the shell side.

EXAMPLE 1

The reactor described above with an external heat exchanger was used to copolymerize ethylene with butene-1 or propylene for two years. During the first year of operation it was necessary to shut down the reactor 15 times to clean the external heat exchanger of polymer build-up from entrained resin particles while during the second year 17 shut downs were required. During the two year period of operation, catalysts A through C described above were used in the reactor.

EXAMPLE 2

The reactor used in Example 1 was converted to the configuration depicted in FIG. 1 through the removal of the external heat exchanger and installation of an internal cooler as described above. The reactor was used to co-polymerize ethylene with butene-1 or propylene and was operated for 11 months in this configuration during which time no shut downs were caused by the internal cooler. Catalysts A through D were used in the reactor during this eleven month period.

EXAMPLES 3-6

These Examples describe specific operation of the reactor described in Example 2 while operating with each of catalysts A through D.

EXAMPLE 3

Catalyst A prepared as disclosed above was run in the reactor described in Example 2 under a gas velocity of 4-6 times Gmf and a pressure of 300 psig. The catalyst contained 0.3 wt percent Cr, 4.2 wt percent Ti and 0.6 wt percent F. The other reaction conditions and the properties of the resin produced are listed below:

| Reaction Conditions | | Resin Properties | |
|---|---|---|---|
| Temp., °C. | 87.5 | Melt Index | 0.20 |
| $C_4H_8/C_2H_4$ mole ratio | 0.10 | Flow Rate | 21.8 |
| | | Melt flow ratio | 109 |
| Bed level, ft | 8 | Density | 0.919 |
| Space Time Yield | | Average Particle | |
| lb/hr/ft$^3$ | 5.4 | Size, microns | 965 |
| | | Bulk Density, lb/ft$^3$ | 26.0 |

EXAMPLE 4

Catalyst B prepared as disclosed above was used in the fluidized bed reactor of uniform diameter and internal cooling as described in Example 2 under a gas velocity of 4–6 times Gmf and a pressure of 300 psig to copolymerize ethylene and propylene. The catalyst contained about 1.7 wt percent Cr. The other reaction conditions and the properties of the resin produced are listed below:

| Reaction Conditions | | Resin Properties | |
|---|---|---|---|
| Temp., °C. | 95 | Melt Index | 1.7 |
| $C_3H_6/C_2H_4$ mole ratio | 0.15 | Flow Rate | 83.4 |
| $H_2/C_2H_4$ mole ratio | 0.04 | Melt Flow Ratio | 48.0 |
| Bed level, ft | 5 | Density | 0.953 |
| Space Time Yield | | Average particle | |
| lb/hr/ft$^3$ | 3.8 | size, microns | 810 |
| | | Bulk density, lb/ft$^3$ | 26.0 |

The reactor was operated with Catalyst B at these conditions for 26 hours and gave trouble-free operation.

EXAMPLE 5

Catalyst C prepared as disclosed above was used in the fluidized bed reactor of uniform diameter with internal cooling as described in Example 2 under a gas velocity of 4–6 times Gmf and at a pressure of 300 psig to copolymerize ethylene and butene-1. The catalyst contained 0.3 wt percent Cr and 0.9 wt percent Al. The other reaction conditions and the properties of the resin produced are listed below:

| Reaction Conditions | | Resin Properties | |
|---|---|---|---|
| Temp., °C. | 103 | Melt Index | 0.6 |
| $C_4H_8/C_2H_4$ mole ratio | 0.009 | Flow Rate | 41.4 |
| $H_2/C_2H_4$ mole ratio | 0.073 | Melt flow ratio | 72.7 |
| Bed level, ft | 5 | Density | 0.958 |
| Space Time Yield | | Average Particle | |
| lb/hr/ft$^3$ | 4.4 | Size microns | 660 |
| | | Bulk Density, lb/ft$^3$ | 28.0 |

The reactor was operated using Catalyst C at these conditions for 24 hours and gave trouble-free operation.

EXAMPLE 6

Catalyst D prepared as disclosed above was used in the fluidized bed reactor of uniform diameter with internal cooling as described in Example 2 under a gas velocity of 4–6 times Gmf and at a pressure of 300 psig to copolymerize ethylene and butene-1. The catalyst contained 1.0 wt percent Ti, 3.4 wt percent Al, 3.4 wt percent Mg and about 9 wt percent THF. The other reaction conditions and the properties of the resin produced are listed below:

| Reaction Conditions | | Resin Properties | |
|---|---|---|---|
| Temp. °C. | 85 | Melt Index | 1.87 |
| $C_4H_8/C_2H_4$ mole ratio | 0.42 | Flow Rate | 47.4 |
| $H_2/C_2H_4$ mole ratio | 0.26 | Melt flow ratio | 24.8 |
| Bed level, ft | 5 | Density | 0.927 |
| Space Time Yield | | Average Particle | |
| lb/hr/ft$^3$ | 3.4 | Size, microns | 965 |
| | | Bulk Density, lb/ft$^3$ | 16.8 |

The reactor was operated using Catalyst D at these conditions for 16 hours and gave trouble-free operation.

What is claimed is:

1. A continuous low pressure gas phase process for the production of solid particulate polymers during an exothermic polymerization reaction in a fluid bed reaction system comprising a vertical fluidized bed reactor which is of uniform diameter through its entire height, said reaction system being devoid of particle entrainment means, which comprises feeding a polymerization catalyst and a gaseous stream containing at least one polymerizable monomer to a fluidized bed of polymer particles in said reactor at a pressure of 50 to 1000 psi, removing the exothermic heat of reaction with, as the only cooling means employed for such purpose, indirect cooling means in said fluidized bed in said reactor and removing particulate polymer from said reactor, and wherein the mass gas flow rate through the fluidized bed is in the range of from about 1.5 to $<10$ $G_{mf}$ based on the minimum free cross-sectional area of the bed.

2. A process as in claim 1 wherein the temperature of the reaction is 30° to 125° C.

3. A process as in claim 2 wherein the temperature is 75° to 115° C.

4. A process as in claim 1 wherein the pressure is 50 to 350 psi.

5. A process as in claim 1 wherein the catalyst is a high activity chromium and/or titanium containing catalyst.

6. A process as in claim 1 wherein the polymer is an olefin polymer.

* * * * *